J. H. MILLER.
BATTERY TESTER.
APPLICATION FILED JULY 1, 1920.

1,408,759.

Patented Mar. 7, 1922.
2 SHEETS—SHEET 1.

Inventor
John H. Miller
Williams, Bradbury,
See & McCabb Attys

J. H. MILLER.
BATTERY TESTER.
APPLICATION FILED JULY 1, 1920.
1,408,759.
Patented Mar. 7, 1922.
2 SHEETS—SHEET 2.
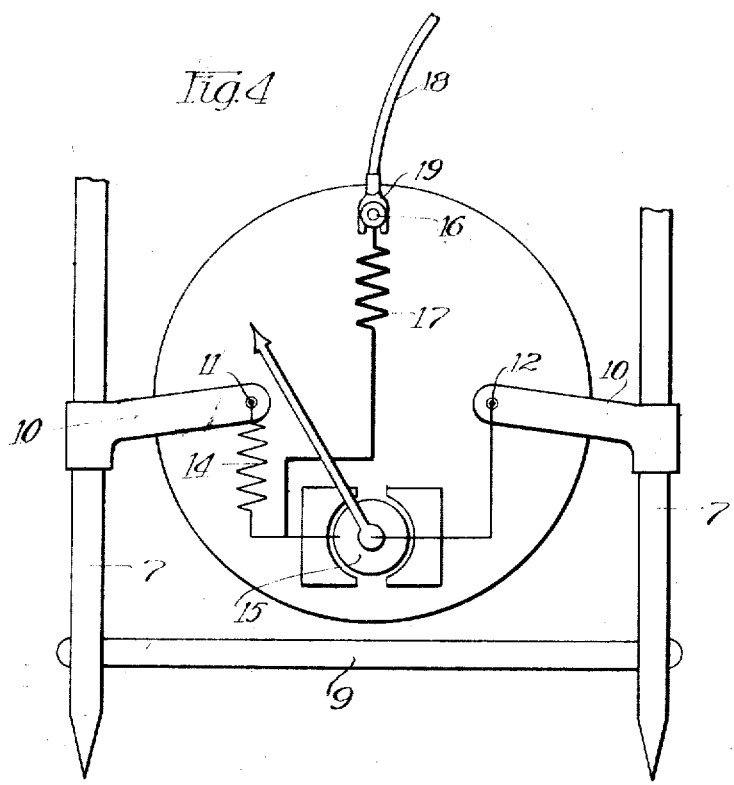
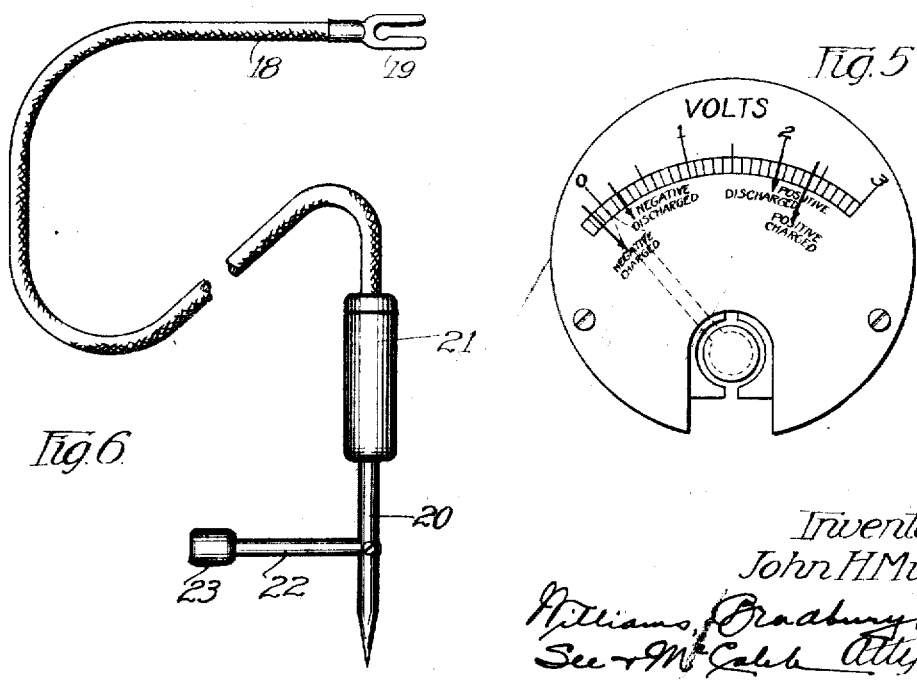
Inventor:
John H Miller

UNITED STATES PATENT OFFICE.

JOHN H. MILLER, OF OAK PARK, ILLINOIS, ASSIGNOR TO JEWELL ELECTRICAL INSTRUMENT COMPANY, OF CHICAGO, ILLINOIS, A CORPORATION OF ILLINOIS.

BATTERY TESTER.

1,408,759.  Specification of Letters Patent.  Patented Mar. 7, 1922.

Application filed July 1, 1920. Serial No. 393,367.

*To all whom it may concern:*

Be it known that I, JOHN H. MILLER, a citizen of the United States, and resident of Oak Park, in the county of Cook and State of Illinois, have invented a certain new and useful Improvement in Battery Testers, of which the following is a full, clear, concise, and exact description, reference being had to the accompanying drawings, forming a part of this specification.

My invention relates to a device for testing storage batteries, and contemplates the provision of a device of this class that is especially useful in making three different kinds of tests, to-wit:

First, a test of the potential difference between the positive and negative terminals of any cell under a heavy discharge of current.

Secondly, a test of the potential difference between the positive and negative terminals of a cell or battery of cells when the same is not necessarily undergoing any substantial current discharge, and Thirdly, a test of the potential difference between any positive or negative plate, and a neutral substance, such as cadmium, immersed in the electrolyte with the plate under test.

Prior to my invention there has been provided a type of battery testing device which comprises a pair of prods, mechanically connected at their upper ends by a handle, and having their pointed lower ends spaced apart to facilitate the application thereof to the terminals of the cell under test. In this prior device, the prods are connected by a heavy shunt, and also carried by the prods and having its terminals connected therewith is a volt meter, capable of indicating the voltage drop across the shunt when the prods are applied to the terminals of the cell under test. This type of battery tester has been found very satisfactorily to indicate the ability of a cell to supply heavy current demands of short duration. However, the general usefulness and serviceability of this prior type of battery tester has been limited, because all devices of this kind have either been totally incapable of being used in taking open circuit voltage readings between plates of opposite polarity, and incapable of being used in making cadmium tests or have required the electrical disconnection of the shunt from one or the other of the prods before the device has been capable of use in taking readings of the kind last mentioned.

I have found that it is extremely desirable that the electrical connection between the prods and the shunt as well as the electrical connection between the prods and the connected volt meter terminals shall be fixed and permanent. My present invention enables me to provide a battery tester in which these electrical connections are fixed and permanent, without in any way depriving myself of the use of the device in taking open circuit voltage readings, or in making cadmium tests.

In the accompanying drawings illustrating a characteristic embodiment of my invention—

Figure 4 is a diagrammatic representation of the several parts of the volt meter and their electrical connections;

Figure 5 illustrates the dial with which I prefer to provide the volt meter and

Figure 6 illustrates a combination lead which I prefer to use in connection with the device of my invention when taking open circuit voltage readings, and when making a cadmium test.

Similar characters of reference refer to similar parts throughout the several views.

Figure 1:
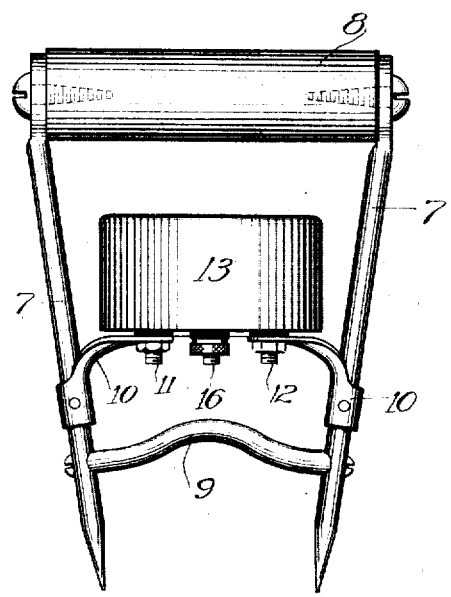
Figure 1 is a front elevational view of the device of my invention.
Figure 2:
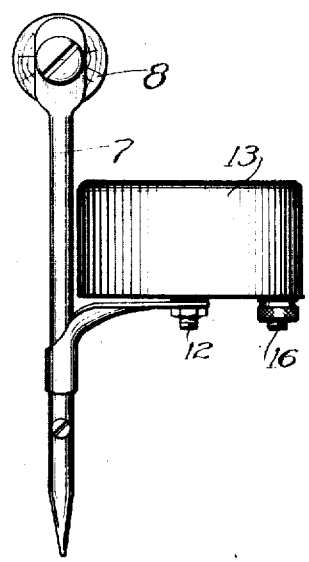
Figure 2 is a side elevational view thereof.
Figure 3:
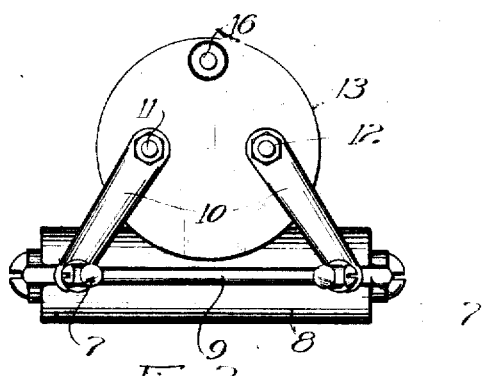
Figure 3 is a bottom view of the volt meter.

The device of my invention comprises two rigid metal prods 7—7 each of which has its upper end fixed to the wood handle 8, the pointed lower ends of the prods being spaced apart a distance sufficient to facilitate ready application of the prods to the terminals of a cell being tested. The prods are permanently electrically connected by a heavy shunt 9 which is arranged to cause a heavy discharge of current from the cell to the terminals to which the pointed ends of the prods are applied. The shunt 9 may be of any suitable material, such, for instance, as nichrome or advance metal, these materials being especially suitable because their electrical resistance characteristic is not materially affected by changes in temperature.

It will be noted that each of the prods is provided with a bracket 10, which affords electrical connection between the prod and one of the terminals 11 or 12 of the volt meter 13. The brackets 10—10 not only electrically connect the volt meter across the prods 7—7, but also serve to support the volt meter case in the position shown.

Referring now to Figure 4, it will be noted that the volt meter terminal 11 is connected with one end of the main resistance 14, the other end of which is electrically connected with one end of the movable coil 15, the other end of which coil is connected with the volt meter terminal 12. As thus far described, the volt meter connections are purely conventional, it being understood that the resistance 14 is so adjusted that when the pointed ends of the prods 7—7 are applied to the terminals of the cell under test, the volt meter will afford a reading in terms of the voltage drop across the shunt 9. It will be understood, of course, that while I have illustrated a volt meter of the well-known D'Arsonval type, a volt meter of any other suitable type may be employed if desired.

It will be noted that the volt meter is provided with a third terminal indicated at 16, which is permanently electrically connected with one end of an auxiliary resistance 17, the other end of which auxiliary resistance is permanently electrically connected with the volt meter circuit at a point intermediate the main resistance 14 and the movable coil 15.

Referring now to Figure 6, the device there shown comprises a flexible insulated conductor 18, provided at one end with a terminal 19 capable of ready application to the volt meter terminal 16. At its other end, the conductor 18 is provided with a brass prod 20 which is conveniently provided with a wood handle 21. Projecting laterally from the brass rod 20 is a cadmium rod 22, which conveniently has one of its ends passing through an opening in the brass prod 20, and secured therein by any suitable means as for instance by a set screw as shown. The free end of the cadmium rod is preferably provided with an insulating cap 23 to prevent this end of the cadmium rod from engaging either of the plates of a cell into the electrolyte of which the cadmium rod is placed in making a cadmium test.

In order to utilize the device of my invention for making open circuit voltage readings or for making a cadmium test, the terminal 19 of the device shown in Figure 6 is applied to the volt meter terminal 16. If it is an ordinary open circuit voltage reading that is being taken either one or both of the prods 7—7 is applied to one terminal and the brass prod 20 is applied to the other terminal. Under these conditions, the meter circuit is traced from terminal 16 through resistance 17 from which point the current divides, part flowing through the movable coil 15, and the rest flowing through the main resistance 14. The greater portion of the current, however, will flow through the movable coil 15 since the same affords a path of less resistance than the resistance element 14. The auxiliary resistance 17 is so calibrated that under the conditions just described the volt meter will afford a reading in terms of the potential difference between the prods 7 and the prod 20.

In making a so-called cadmium test, either one or both of the prods 7 is applied to the plate under test, and the cadmium electrode 22 is inserted into the electrolyte which is in contact with that plate. Under these conditions, the volt meter hand will afford a reading in terms of the potential difference between the plate under test and the neutral cadmium.

I prefer to provide the volt meter with a dial of the kind shown in Figure 5. This dial comprises in addition to the usual volt meter scale, certain arrows and indicia associated with that scale which afford information in terms of plate charge or discharge when the cadmium test is made.

From the foregoing it will be seen that I have provided a battery testing device which may not only be used for taking voltage readings while the cell is undergoing heavy discharge, but which also may be used for taking ordinary open circuit voltage readings, and for making cadmium tests without in any way disturbing the permanent electrical connections between the spaced prods and their associated heavy shunt, or between the spaced prods and the volt meter terminals.

Having thus described my invention, what I claim is new, and desire to secure by Letters Patent of the United States is:

1. A battery tester comprising a pair of spaced prods permanently electrically connected by a shunt capable of causing a heavy discharge of current from a cell to the terminals of which said prods are applied, a volt meter carried by said prods, said volt meter comprising an indicating device and an actuating coil therefor, one end of said coil being permanently electrically connected with one of said prods, the other end of the coil being permanently electrically connected with the other prod through a resistance in series with the coil, an auxiliary resistance having one end thereof permanently electrically connected with both the coil and first-named resistance at a point intermediate the two and means for connecting a third prod with the other end of the auxiliary resistance.

2. A battery tester comprising a volt meter having three terminals, an indicator actuating coil and a resistance connected in series between two of said terminals, a shunt electrically connecting said last-named terminals, said shunt arranged to cause a heavy discharge of current from a cell to the terminals of which said shunted volt meter terminals are applied, and an auxiliary resistance having one end thereof connected to the third volt meter terminal, and its other end electrically connected with the coil and first-named resistance at a point intermediate the two.

In witness whereof, I hereunto subscribe my name this 26th day of June, 1920.

JOHN H. MILLER.

Witnesses:
ALICE M. BERTONCINI.
JULIA V. IVES.